No. 670,738. Patented Mar. 26, 1901.
F. C. SCHMIDT & W. H. HAAS.
WAGON BRAKE.
(Application filed Jan. 11, 1901.)
(No Model.)
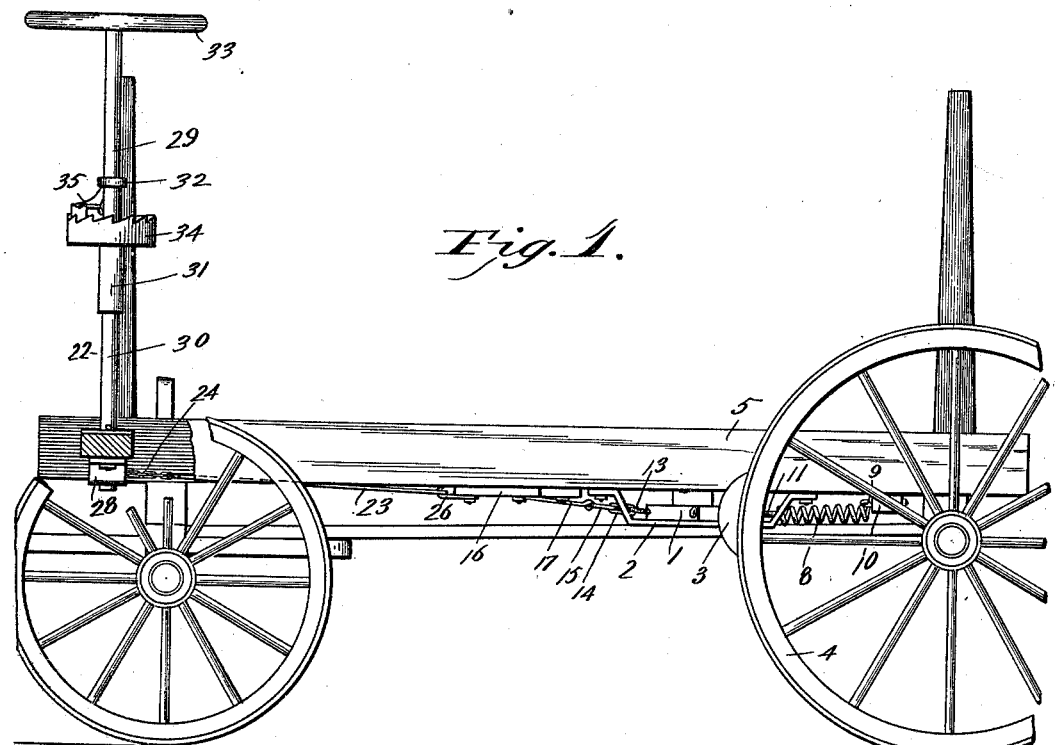
Fig. 1.
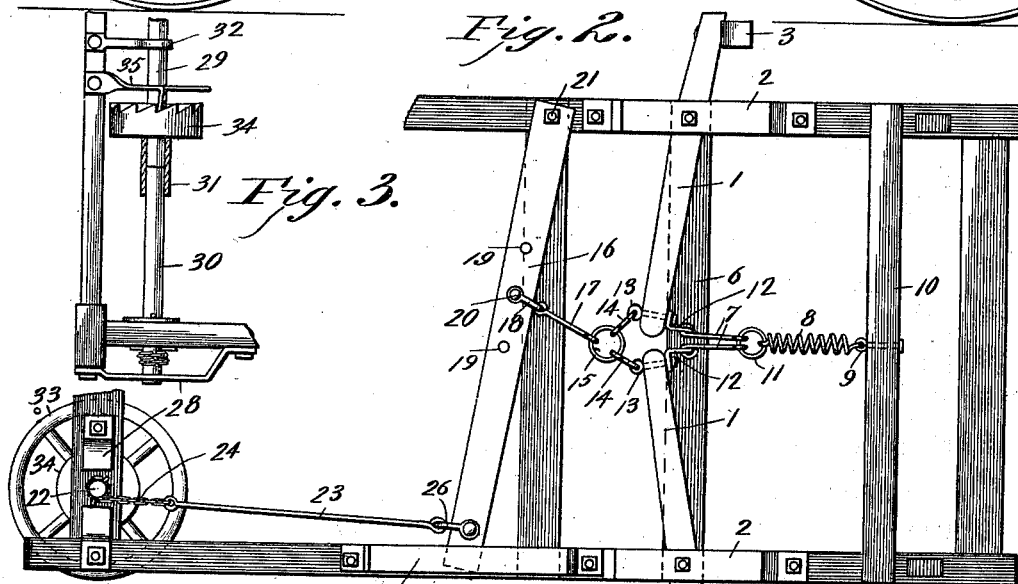
Fig. 2.
Fig. 3.
Witnesses
C. H. Walker.
N. F. Riley.
F. C. Schmidt,
W. H. Haas, Inventors,
by C. A. Snow & Co.
Attorneys.

United States Patent Office.

FRANK C. SCHMIDT AND WILLIAM H. HAAS, OF BLAKELY, MINNESOTA.

WAGON-BRAKE.

SPECIFICATION forming part of Letters Patent No. 670,738, dated March 26, 1901.

Application filed January 11, 1901. Serial No. 42,908. (No model.)

*To all whom it may concern:*

Be it known that we, FRANK C. SCHMIDT and WILLIAM H. HAAS, citizens of the United States, residing at Blakely, in the county of Scott and State of Minnesota, have invented a new and useful Wagon-Brake, of which the following is a specification.

The invention relates to improvements in wagon-brakes.

The object of the present invention is to improve the construction of wagon-brakes and to provide a simple, inexpensive, and efficient one adapted to be employed on vehicles having wood or hay racks or wagon boxes or beds for accommodating comparatively high loads and capable of enabling the driver to apply the necessary pressure to the hind wheels to control a vehicle without descending from its load.

The invention consists in the construction and novel combination and arrangement of parts hereinafter fully described, illustrated in the accompanying drawings, and pointed out in the claims hereto appended.

In the drawings, Figure 1 is a side elevation, partly in section, of a vehicle provided with a brake constructed in accordance with this invention. Fig. 2 is a reverse plan view of the same. Fig. 3 is a detail view illustrating the construction of the pawl and ratchet.

Like numerals of reference designate corresponding parts in all the figures of the drawings.

1 1 designate a pair of brake-levers fulcrumed between their ends in suitable brackets or supports 2 and provided at their outer ends with brake-shoes 3, located in advance of and adapted to engage the hind wheels 4 of a wagon 5, which, as illustrated in Fig. 1, is provided with a wood-rack; but the brake may be applied to a wagon having a hay-rack or any other suitable means for supporting a high load. The brackets or supports 2 consist of loops or frames extending longitudinally of and secured to the sides of the frame of the wood-rack, and the brake-levers, which are preferably located beneath a transverse bar 6, have their inner ends connected by links or rods 7 with a coiled spring 8, located in rear of the levers and adapted to throw the brake-shoes off the wheels when the operating mechanism for applying the brake is released. The coiled spring 8 is secured by an eyebolt 9 to a transverse bar 10, and it is connected at its front end with a ring 11, which is linked into suitable eyes of the rods or links 7, which are provided at their front ends with eyes. The front eyes of the links or rods 7 engage perforations of L-shaped plates 12, which are secured by eyebolts 13 to the inner ends of the brake-levers, as clearly shown in Fig. 2. These eyebolts have their eyes arranged at the front edges of the inner ends of the brake-levers, and they are connected by links 14 with a ring 15. The ring 15, which is located in advance of the inner ends of the brake-levers, is connected with a transverse lever 16 by means of a rod 17 and a clevis 18. The clevis, which is substantially U-shaped, is adjustable by means of perforations 19, and a bolt 20 is linked into the eye at the front end of the rod 17, and the latter is also provided at its rear end with an eye to receive the ring 15. The transverse lever is fulcrumed at one end on the frame of the wood-rack by means of a pivot 21, and its other end is connected with a brake staff or shaft 22 by means of a rod 23 and a flexible connection 24. The rear end of the connecting-rod is provided with an eye which is linked into a swinging clevis or link 26 of approximately U form, and the link or clevis, which has its sides arranged at the upper and lower faces of the lever, is secured to the same by a bolt or other suitable fastening device.

The flexible connection may consist of a chain or any other suitable device, and it is secured to the front end of the connecting-rod, which is provided with an eye, and the said flexible connection is secured to and arranged to be wound around the lower end of the brake-shaft. The lever 16 is arranged within a guide 27, secured to and extending longitudinally of one side of the frame of the wood-rack and preferably consisting of a strip of metal angularly bent at its ends to form L-shaped arms, which are fastened to the said frame. The lower end of the brake-shaft is arranged within an opening of a bearing bracket or support 28, secured to the front portion of the frame and disposed transversely thereof and composed of a bottom portion and L-shaped arms secured to the said frame.

The brake shaft or staff is composed of upper and lower sections 29 and 30, connected by a coupling-sleeve 31, which receives the adjacent ends of the said sections, and the lower end of the lower section is journaled in the said bearing-bracket, and it passes through an opening of the front transverse bar of the wood-rack frame and is supported by the same. The upper section of the brake-shaft is supported by a brace 32, consisting of a horizontal arm secured to and extending from one of the standards of the wood-rack and provided at its outer end with an opening to receive the shaft. The brake-shaft is provided at its upper end with a hand-wheel 33, and it carries a ratchet-wheel 34, located at the upper end of the coupling-sleeve and engaged by a pawl 35, and the latter is pivoted at one end to the adjacent standard of the wood-rack and is provided between its ends with a depending tooth or engaging portion. The ratchet-wheel is provided at its upper face with ratchet-teeth, and it supports the pawl, as clearly illustrated in Fig. 3 of the accompanying drawings. The hand-wheel is adapted to be readily turned by the driver, and the pawl, which automatically engages the ratchet-wheel, is adapted to be readily lifted out of such engagement by the foot of the driver.

It will be seen that the brake mechanism is exceedingly simple and inexpensive in construction, that it is adapted to be readily applied to various kinds of vehicles, and that as the brake-shaft extends a considerable distance above the running-gear it is adapted to be readily rotated for applying the brake without necessitating the driver descending from a load. The brake will enable sufficient pressure to be applied to the hind wheels to stop a load of hay or other heavy load while a vehicle is ascending or descending a hill for the purpose of resting the horses, and this may be effected without the driver descending from such load.

What is claimed is—

1. In a brake, the combination of a vehicle, a pair of transverse brake-levers fulcrumed between their ends and provided with brake-shoes, L-shaped plates arranged at the inner ends of the brake-levers and extending rearward therefrom, a coiled spring secured at its rear end to the vehicle and provided at its front end with a ring, links connected with the ring and with the L-shaped plates, the front ring 14 connected with the inner ends of the brake-levers, a transverse lever adjustably connected with the front ring 15, and a brake-shaft connected with the transverse lever and disposed vertically, substantially as described.

2. In a brake, the combination of a vehicle, a pair of transverse brake-levers fulcrumed between their ends and provided at their outer ends with brake-shoes, L-shaped plates arranged at the inner ends of the levers and extending rearwardly therefrom, a coiled spring located in rear of the brake-levers, links connected with the L-shaped plates and with the coiled spring, a transverse lever fulcrumed at one end, eyebolts securing the L-shaped plates to the brake-levers, a pair of links 14, arranged in the eyes of the said bolts, a front ring 15 connected with the links 14, a clevis adjustably mounted on the transverse lever, a rod or link connected with the front ring 15 and with the said clevis, a vertical brake-shaft, a pawl and ratchet, and connections between the brake-shaft and the transverse lever, substantially as described.

3. In a brake, the combination of a vehicle, a vertical shaft composed of upper and lower sections and provided with a coupling-sleeve, a ratchet-wheel arranged at the upper end of the coupling-sleeve, a pivoted pawl provided between its ends with a tooth resting upon and engaging the ratchet-wheel, a transverse lever fulcrumed at one end and connected at the other end with the vertical shaft, and brake-levers adjustably connected with the transverse lever and provided with brake-shoes, substantially as described.

In testimony that we claim the foregoing as our own we have hereto affixed our signatures in the presence of two witnesses.

FRANK C. SCHMIDT.
WILLIAM H. HAAS.

Witnesses:
  FRED. M. CHARD,
  MATHIAS SCHMITT.